United States Patent
Groeneveld et al.

(10) Patent No.: US 6,434,209 B1
(45) Date of Patent: Aug. 13, 2002

(54) CRITICAL POWER ENHANCEMENT SYSTEM FOR A PRESSURIZED FUEL CHANNEL TYPE NUCLEAR REACTOR USING ALIGNMENT OF FUEL BUNDLE PAIRS

(75) Inventors: Dé C. Groeneveld, Deep River; John R. Schenk, Pembroke; Rayman Sollychin, Mississauga, all of (CA)

(73) Assignee: Atomic Energy of Canada Limited/Energie, Ottawa (CA)

(*) Notice: Subject to any disclaimer, the term of this patent is extended or adjusted under 35 U.S.C. 154(b) by 0 days.

(21) Appl. No.: 09/406,141

(22) Filed: Sep. 27, 1999

(51) Int. Cl.[7] .................................................. G21C 3/00
(52) U.S. Cl. ...................... 376/433; 376/267; 376/366; 376/368; 376/401; 376/434; 376/442; 376/448; 376/454
(58) Field of Search ................. 376/267, 366, 376/368, 401, 442, 433, 434, 454, 448

(56) References Cited

U.S. PATENT DOCUMENTS

| | | | |
|---|---|---|---|
| 3,009,868 A | 11/1961 | Moulin | 204/193.2 |
| 3,110,658 A | 11/1963 | Guibert | 204/193.2 |
| 3,128,235 A | * 4/1964 | Hackney et al. | 176/77 |
| 3,142,627 A | * 7/1964 | Emerson | 176/78 |
| 3,185,632 A | 5/1965 | Bradley | 176/68 |
| 3,227,623 A | 1/1966 | White | 176/77 |
| 3,249,505 A | * 5/1966 | Laurent et al. | 176/43 |
| 3,598,700 A | * 8/1971 | Lambert | 176/76 |
| 3,663,365 A | 5/1972 | Pettinger et al. | 176/77 |
| 3,941,654 A | * 3/1976 | Tarasuk et al. | 176/61 |
| 5,383,227 A | 1/1995 | Macduff | 376/261 |
| 5,493,590 A | * 2/1996 | Sollychin et al. | 376/401 |

FOREIGN PATENT DOCUMENTS

| | | | |
|---|---|---|---|
| CA | 2180545 | * | 8/1999 |
| DE | 1195877 | * | 5/1960 |
| DE | 11 95 877 B | | 7/1965 |
| DE | 004117623 A | * 2/1993 | ............ G21C/3/334 |
| FR | 1378779 | * | 1/1964 |
| GB | 1 205 681 A | | 9/1970 |

OTHER PUBLICATIONS

D.C. Groeneveld and W.W. Yousef, "Spacing Devices for Nuclear Fuel Bundles: A Survey Of Their Effect On CHF, Post–CHF Heat Transfer and Pressure Drop", Proc. Of the ANS/ASME/NRC Int. Topical Meeting on Nucl. Reactor Thermal–Hydraulics, vol. 2, pp. 1111–1125, Saratoga Springs, NY Oct. 5–8, 1980.

N. Spinks and D. . Groeneveld, Thermal Power Uprating of Candu Reactors, Paper presented at CNS Conference, Saint John NB, Jun., 1987.

D.C. Groeneveld, I.P.L. Macdonald, W.I. Midvidy, S.C. Sutradhar and D.E. Bullock, "Analytical and Experimental Studies in Support of Fuel Channel Critical Power Improvements,":. Proc. of the CNS Meeting, Toronto, Jun. 9–10, 1986.

* cited by examiner

Primary Examiner—Charles T. Jordan
Assistant Examiner—John Richardson
(74) Attorney, Agent, or Firm—Sughrue Mion, PLLC

(57) ABSTRACT

A Critical Channel Power (CCP) enhancement system is provided for a pressurized fuel-channel-type water-cooled nuclear reactor of the type adapted to be refuelled on-line by the insertion and removal of fuel bundles onto and from of a plurality of said fuel channel assemblies, each of said fuel channel assemblies. A means is provided for interlocking fuel bundles into pairs having their fuel elements aligned, thereby lowering the hydraulic resistance in the fuel channel and enhancing CCP. The means for interlocking prevents misalignment of the paired bundles during their residence time inside the reactor due to continuous rocking and vibration of the fuel bundles exposed to very high coolant mass flow rate and misalignment due to axial separation of bundles impacting upon one another during fuelling operations.

6 Claims, 4 Drawing Sheets

CRITICAL POWER ENHANCEMENT SYSTEM FOR A PRESSURIZED FUEL CHANNEL TYPE NUCLEAR REACTOR USING ALIGNMENT OF FUEL BUNDLE PAIRS

The present invention relates to a critical power enhancement system for a pressurized fuel channel type nuclear reactor by reducing the fuel channel's hydraulic resistance and thereby improving the critical heat flux of the fuel bundles.

BACKGROUND OF THE INVENTION

The CANDU® reactor is an example of a pressurized fuel channel type nuclear reactor. It contains about 400 horizontally oriented pressure tubes each defining a fuel channel. Each fuel channel contains a plurality of fuel bundles longitudinally disposed in end-to-end relation within the pressure tube. Each fuel bundle comprises a plurality of elongated fuel rods containing fissionable material. The fuel rods are retained in parallel spaced relation uniformly about a central longitudinal axis between transversely disposed end plates. The end plates are of an open web design having apertures there through. High-pressure heavy or light water coolant, enters the fuel channel at one end, flows through the fuel bundles passing through the end plates and the spaces between the fuel rods so as to cool the fuel rods and remove heat produced by the fission process, and exits from the fuel channel at the other end. This heat is subsequently transferred by the coolant to a heat exchanger which produces steam that drives a turbine to produce electrical energy. The water flowing through the fuels bundles is pressurized and does not boil significantly.

The maximum power that can be produced within a fuel channel is determined by the maximum power that can be produced safely by individual fuel bundles within the fuel channel. The maximum power that can be produced within the fuel channel is normally referred to as the Critical Channel Power or CCP. The maximum power that can be produced safely in any given fuel bundle within that channel is called the Critical Bundle Power, and it is determined by variation in power production within the bundle, the corresponding local coolant conditions, and the design of the fuel bundle. The Critical Bundle Power is the power corresponding to the onset of a significant decrease in the efficiency of heat transfer from the bundle to the coolant, and the local heat flux at which this happens is referred to as the Critical Heat Flux or CHF. Since the high temperatures that can occur when the CHF is exceeded may damage the fuel bundle, the channel power and flow conditions are set to ensure that the CHF is never exceeded in any bundle.

Mechanistically, CHF occurs on a heated fuel element when some part of its surface can no longer be continuously wetted by the liquid coolant. There are two possible mechanisms leading to CHF: (i) breakdown of the liquid film, or "dryout" on the fuel element sheath surface; or (ii) coalescence of bubbles near the fuel element sheath surface to form a vapour film. The actual mechanism depends upon the thermohydraulic conditions of the coolant surrounding the fuel element.

In order to ensure that the CHF is never exceeded in any bundle, a safety factor or operating margin is applied to the CCP, which in turn results in the power that can be produced by the reactor being reduced by approximately the same factor. If, however, the CCP could be increased, the power that could be produced by the reactor could also be increased. A similar situation apples to other types of water-cooled reactors.

In a given reactor, the pressure in the fuel channel is controlled by the reactor outlet header pressure and the enthalpy within the channel is controlled by the inlet header temperature. These values have been optimized and normally do not change. Hence, the CCP is primarily a function of the channel flow. Most of the known methods for improving the CCP seek to enhance CHF by adding turbulence inducing devices to selected locations within the fuel bundles. One example of the use of such devices is described in U.S. Pat. No. 5,493,590 issued to Atomic Energy of Canada Limited on Feb. 20, 1996. Such methods often achieve enhanced CHF at the expense of an increase in hydraulic resistance within the fuel channel. As discussed below, an increase in hydraulic resistance in the fuel channel causes the coolant flow to decrease, causing the CHF to occur at a lower fuel channel power. The resulting CCP is either worse than the case without the CHF enhancement devices, or is only marginally improved. High hydraulic resistance may also reduce the coolant flow through the fuel channels in an existing reactor that was not designed to accommodate a large pressure-drop resulting from such a large hydraulic resistance, thus affecting the overall performance of the reactor. In addition, turbulence enhancing devices require mechanical changes to the fuel bundle and can require corresponding change to the fuelling system and fuel handling apparatus of pressurized fuel channel type reactors, which is undesirable.

SUMMARY OF THE INVENTION

The present invention provides a critical power enhancement system for a pressurized fuel channel type nuclear reactor, which improves the critical heat flux of the fuel bundles by reducing the hydraulic resistance in the fuel channel.

In accordance with one aspect of the present invention, there is provided a fuel bundle pair assembly for use in a pressurized water-cooled nuclear reactor of the type adapted to be refuelled on-line (that is while operating at full power) by the insertion and removal of fuel bundles into and from a plurality of pressure tubes, said fuel bundle pair assembly comprising a pair of fuel bundles in end-to-end relation, each fuel bundle comprising a plurality of elongated fuel elements retained in parallel spaced relation uniformly about a longitudinal axis between transversely disposed end-plates, said end plates having an open web structure with apertures there through to permit coolant flow through said fuel channels in contact with said fuel elements, means for interlocking said pair of fuel bundles so as to maintain said fuel elements in a predetermined position of relative rotational alignment about said longitudinal axis and prevent axial separation of said pair of fuel bundles, said fuel bundle pair assembly being axially separable from adjacent bundles in a pressure tube to permit independent loading or unloading of said fuel bundle pair assembly.

In accordance with another aspect of the invention, there is provided a fuel channel assembly for use in a fuel-channel-type nuclear reactor of the type adapted to be refuelled on-line by the insertion and removal of fuel bundles into and from a plurality of fuel channel assemblies, each of said fuel channel assemblies comprising an elongated pressure tube and a plurality of fuel bundles longitudinally disposed in said pressure tube in end-to-end relation, each of said fuel bundles comprising a plurality of elongated fuel elements retained in parallel spaced relation uniformly about a longitudinal axis between transversely disposed end-plates, said end plates having apertures there through to permit coolant flow through said fuel channels in contact with said fuel elements, the fuel channel assembly further comprising at least one fuel bundle pair assembly, said fuel bundle pair assembly comprising a pair of fuel bundles in end-to-end relation and means for interlocking said pair of fuel bundles so as to maintain said fuel elements in a predetermined position of relative rotational alignment about said longitudinal axis and prevent axial separation of said pair of fuel bundles, said fuel bundle pair assembly being axially separable from adjacent bundles in the pressure tube to permit independent loading or unloading of said fuel bundle pair assembly.

In accordance with another aspect of the invention, there is provided a method of increasing the Critical Channel Power (CCP) in a pressurized fuel-channel-type nuclear reactor of the type adapted to be refuelled on-line by the insertion and removal of fuel bundles into and from a plurality fuel channel assemblies, each of said fuel channel assemblies comprising an elongated pressure tube and a plurality of fuel bundles longitudinally disposed in said pressure tube in end-to-end relation, each of said fuel bundles comprising a plurality of elongated fuel elements retained in parallel spaced relation uniformly about a longitudinal axis between transversely disposed end-plates, said end plates having apertures there through to permit coolant flow through said fuel channels in contact with said fuel elements, the method comprising the steps of interlocking the facing end-plates of a pair of fuel bundles in end-to-end relation to maintain a predetermined position of relative rotational alignment about said longitudinal axis and prevent axial separation of said pair of fuel bundles, inserting said interlocked pair of fuel bundles into a fuel channel, and removing two unpaired fuel bundles from said fuel channel.

In accordance with another aspect of the invention, there is provided a fuel bundle end-plate for retaining a plurality of elongated fuel elements in parallel spaced relation uniformly about a longitudinal axis, said end plate having an open web structure with apertures therethrough to permit coolant flow through said fuel channels in contact with said fuel elements, said end plate comprising inner, intermediate and outer concentric ring web members, said inner and intermediate ring web members being interconnected by inner cross-webs and said intermediate and outer ring web members being interconnected by outer cross-webs and comprising two hook members each connected to a cross-web and having a first leg portion projecting longitudinally and a second leg portion extending transversely, said first and second leg portions together with the cross-web forming a recess adapted to closely receive the corresponding cross-web of a facing end-plate.

BRIEF DESCRIPTION OF THE DRAWINGS

These and other features of the invention will become apparent from the following description in which reference is made to the appended drawings wherein.

DESCRIPTION OF THE PREFERRED EMBODIMENT

Figure 1:
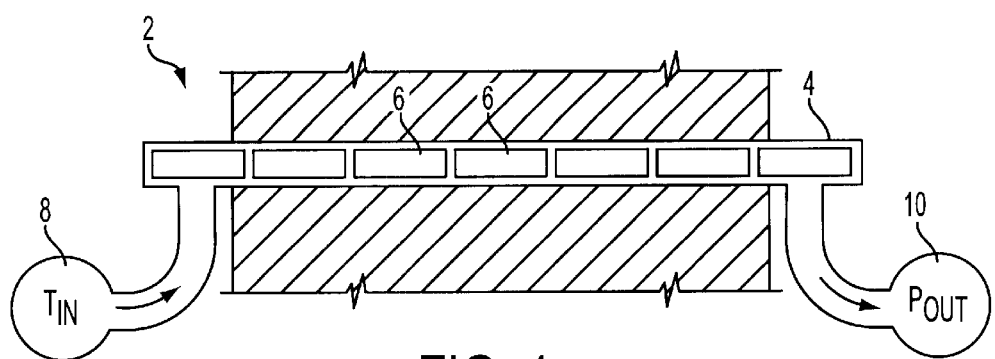
FIG. 1 is a schematic view for explanation of coolant flow in a fuel channel.

Referring first to FIG. 1, a single fuel channel generally indicated by reference numeral 2 comprises pressure tube 4 which contains a plurality of fuel bundles 6 which are longitudinally disposed in pressure tube 4 in end-to-end relation. Although seven fuel bundles are shown in FIG. 1, in a CANDU® type reactor, each fuel channel usually contains 12 or 13 fuel bundles. The coolant, which in the case of a CANDU® type reactor is usually heavy water, is pumped into fuel channel 2 at inlet header 8, flows over fuel bundles 6 and exits the fuel channel at outlet header 10.

Figure 2:
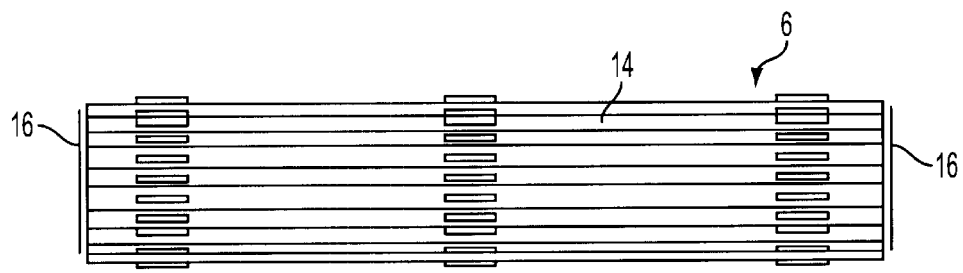
FIG. 2 is a side view of a specific CANDU® fuel bundle, the CANFLEX™ Mk. 4 bundle.

FIG. 2 shows a specific CANDU® fuel bundle, the CANFLEX™ Mk. 4 bundle.: Fuel bundle 6 is comprised of 43 elongated cylindrical fuel elements 14 retained between transversely disposed end-plates 16 in parallel spaced relation uniformly about a central longitudinal axis. The fuel elements contain fissionable nuclear fuel, in the form of uranium dioxide fuel pellets. The fuel elements may have spacer elements (not shown) attached thereto to maintain separation from each other and the outer fuel elements may carry bearing pads 24 to engage the inside surface of pressure tube 4. The fuel elements in a fuel bundle may not all be of the same diameter. While FIG. 2 shows the CANFLEX™ Mk. 4 bundle, it is to be understood that the invention equally applicable to other fuel bundle designs, including the CANDU®-6 bundle which has 37 fuel elements.

Figure 3:
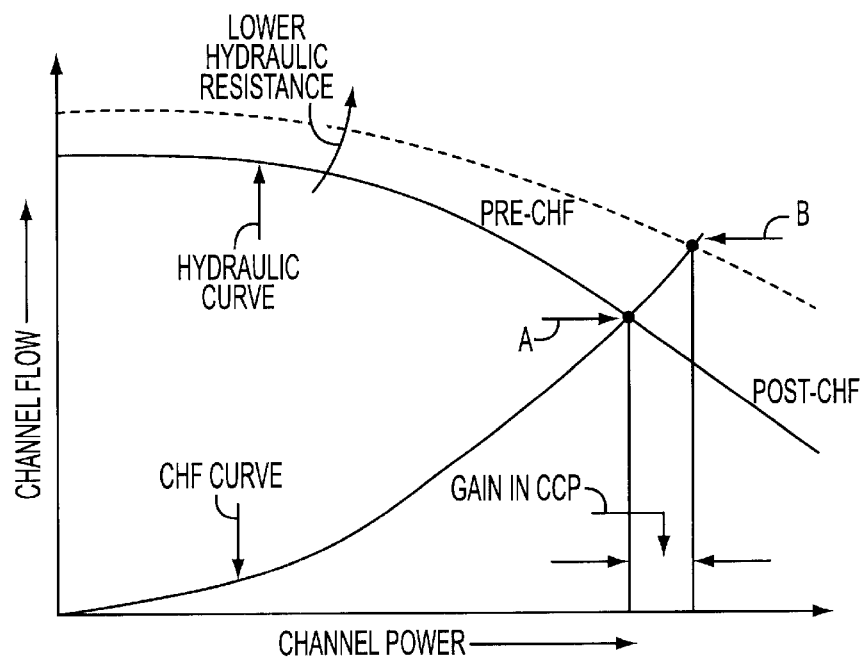
FIG. 3 is a graph showing the variation of CCP with a change in channel hydraulic resistance.

Referring now to FIG. 3, the variation of CCP with a change in channel hydraulic resistance is shown. The curve identified as "Hydraulic Curve" represents schematically the variation in fuel channel flow with channel power, based on the hydraulic characteristics of the fuel channel. For a given channel inlet temperature $T_{IN}$ and channel output pressure $P_{OUT}$ as shown in FIG. 1, the variation in CHF with channel flow is shown by the curve identified as "CHF Curve" so that CHF occurs at condition A. As can be seen in FIG. 3, a lowering of channel hydraulic resistance will decrease the coolant pressure drop and thus causes the flow to increase as represented by the broken line curve and accordingly shifts the CHF from condition A to condition B. The difference between the fuel channel power corresponding to condition B and that corresponding to condition A is the net gain in CCP.

From FIG. 3, it can be concluded that a reduction in fuel channel hydraulic resistance can produce a net gain in CCP. A reduction in fuel channel hydraulic resistance could be achieved by streamlining the fuel bundles, by increasing the cross-sectional coolant flow area, or by reducing the number of transverse end-plates by using longer fuel elements in each bundle. However, all of these require extensive redesign of the fuel bundles and may not be compatible with existing operational reactors.

It has been determined that a reduction in fuel channel hydraulic resistance can also be achieved by maintaining rotational alignment of fuel bundles about their longitudinal axis. Most of the pressure drop in the primary system of a pressurized fuel-channel-type nuclear reactor is encountered in the fuel channels. In the fuel channels, approximately half the pressure drop is due to skin friction, and 35% to 40% is due to the bundle junctions assuming random rotational misalignment about their central longitudinal axis. When bundle junctions are misaligned, the end-plate region of the fuel rods and the two end-plates of two adjacent bundles are not aligned with respect to the flow direction of coolant and thus present a greater transverse cross-sectional area impeding coolant flow.

Figure 4:
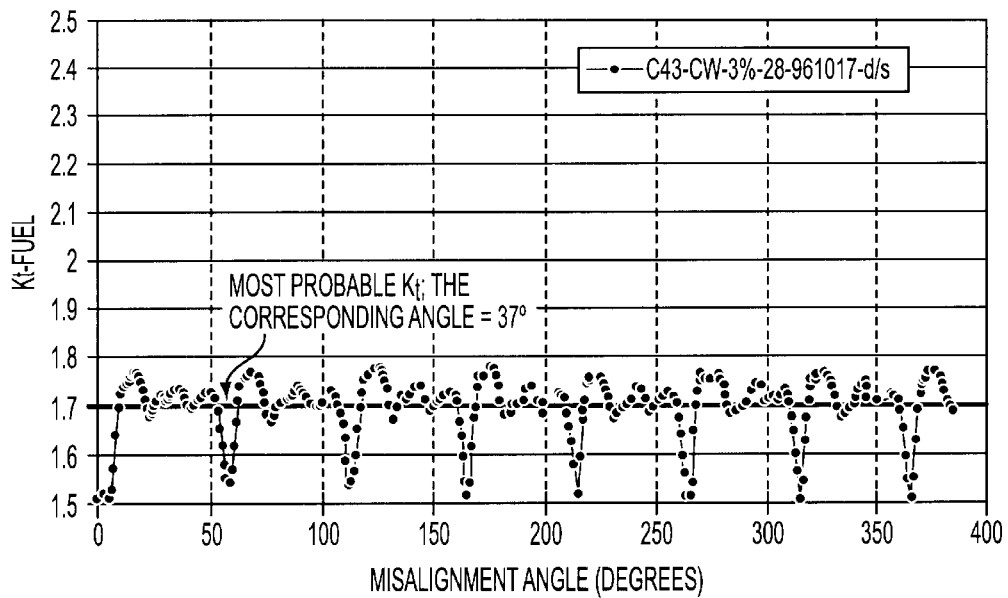
FIG. 4 is a graph showing the effect of bundle misalignment on total bundle loss factor for a specific CANDU® fuel bundle, the CANFLEX™ Mk. 4 bundle.
Figure 5:
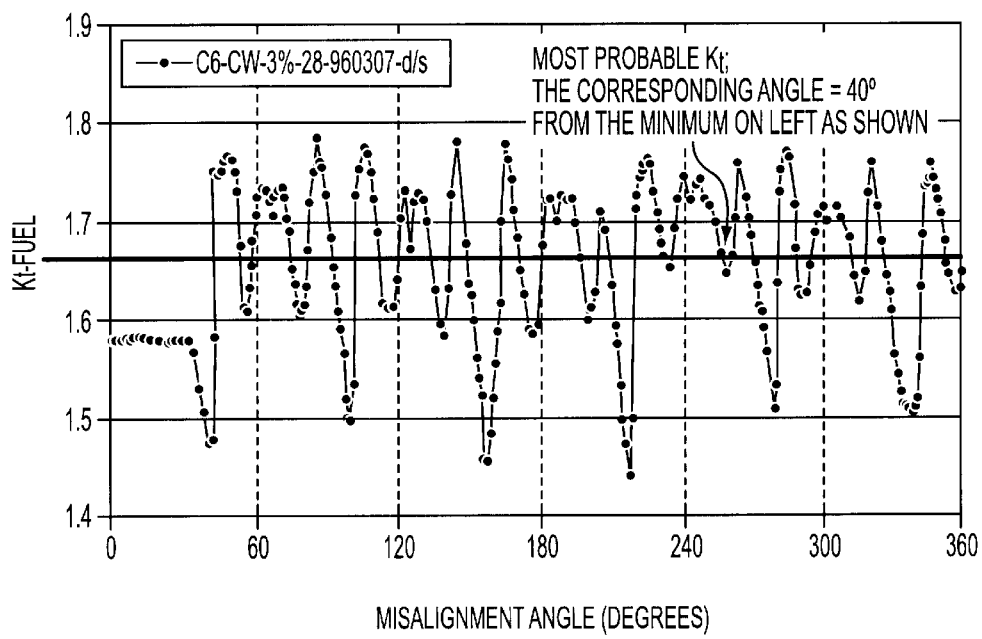
FIG. 5 is a graph showing the effect of bundle misalignment on total bundle loss factor for a specific CANDU® fuel bundle, the CANDU®-6 bundle.

The pressure drop penalty of a bundle junction can be expressed by the hydraulic loss factor, $K_J$ defined as a $K_J = \Delta P/(\rho V^2)$ where $\Delta P$ is the junction pressure drop, $\rho$ is the coolant density and V is the coolant velocity. FIG. 4 is a graph showing the effect of bundle misalignment on total bundle loss factor $K_T$ for the CANFLEX™ Mk. 4 bundle inside a 3% crept pressure tube. The bundle junction signature shown in FIG. 4 exhibits a repeating pattern in total bundle loss factor, that goes through a minimum every 51.4° for the 43 element CANFLEX™ Mk. 4 bundle. Similarly, FIG. 5 is a graph showing the effect of bundle misalignment on total bundle loss factor for the CANDU®-6 bundle inside a 3% crept pressure tube. The bundle junction signature shown in FIG. 5 exhibits a repeating pattern in the bundle loss factor that goes through a minimum every 60° for the 37 element CANDU®-6 bundle. The minimum bundle pressure drop occurs when bundles are rotated about their central longitudinal axis such that the individual fuel rods in adjacent bundles are aligned. The pressure drop penalty of a bundle junction can be reduced if the adjacent bundles could be aligned. Moreover, if the bundles could be aligned and remain aligned while in the reactor core, the channel hydraulic resistance could be significantly reduced, which in turn would increase the flow rate. This increased flow rate would lower the outlet enthalpy and increase the CCP from condition A to condition B as shown schematically in FIG. 3.

However, a number of design and operational limitations inherent with CANDU® type reactors must be overcome in order to achieve and maintain fuel bundle alignment. CANDU® type reactors are refuelled on-line. Remotely operated refuelling machines are used to load fresh fuel bundles into one end of a given fuel bundle and to remove spent fuel bundles from the other end or the same end. Fuel bundles are inserted into fuel channels without any attempt made to align the fuel elements with respect to the fuel elements of the previously installed bundle. While an attempt could be made to align the bundle in the fuel transfer case of the refuelling machine, the bundles would likely misalign during their residence time (approximately 12 months) inside the reactor due to continuous rocking and vibration of the fuel bundles exposed to very high coolant mass flow rate and due to bundles impacting upon one another during fuelling operations. In this regard, in bundle endurance tests, bundles rotations of up to 31° have been observed. Accordingly, any bundle alignment scheme must provide not only for the ability to insert bundles into the fuel channel in a predetermined position of axial alignment with respect to a previously inserted bundle, it must also be effective to restrain the bundles against relative axial rotation throughout their residence time.

In addition, bundle alignment in a CANDU® type reactor must not interfere with conventional refuelling operations. In a CANDU® type reactor, fuel bundles in a given fuel channel are not interconnected. This permits on-line refuelling by loading fuel bundles into one end of the fuel channel and unloading spent bundles out of the other end by the remotely operable fuel handling machines. Conventional refuelling machines have no design functionality that would readily permit the making or breaking of a bundle interconnection scheme of the type that would be effective to restrain relative axial rotation throughout the residence time in the reactor and as a result of impact during refuelling operations. Accordingly, fuel bundle alignment in a CANDU® type reactor cannot readily be achieved by the use of any bundle interconnection means that will interfere with, or require substantial modification to the refuelling operation.

The present invention takes advantage of the fuel bundle path inherent in the on-line refuelling operations for a CANDU® type reactor. In a CANDU® type reactor, refuelling is carried out using an automatically controlled fuelling machine. Fuel bundles, grouped into bundle pairs, are loaded into a fuel transfer mechanism. The bundle pairs are pushed into the fuel loading magazine under semi-automatic control. Fuel bundle pairs are then pushed by an automatically controlled motor-driven ram into vacant magazine positions of the fuelling machine. The fuelling machine moves to the reactor face, locks onto the upstream end of the fuel channel, and a ram assembly removes and stores the fuel channel plug, inserts a fuel bundle pair and replaces the plug. When refuelling is done from both ends, a similar unloading operation is carried out at the downstream side of the fuel channel to discharge spent fuel bundles while the replacement fuel bundles are being loaded at the other end. When refuelling is done only from one end, all fuel bundles are first discharged from the fuel channel and replacement bundles are loaded from the same end. In either case, some of the discharged fuel bundles may be reinserted into the fuel channel according to the fuel management plan.

Thus fuel bundles in a CANDU® type reactor move along the fuel-channel in bundle pairs. Typically, each bundle pair spend one year in a given fuel channel before being discharged. The use of bundle pairs in the refuelling of CANDU® type reactors make possible the use of an interconnecting means for axially aligning paired bundles and for positively interlocking paired bundles against relative axial rotation and separation during the refuelling operation and during their residence time in the reactor fuel channel.

Figure 6:
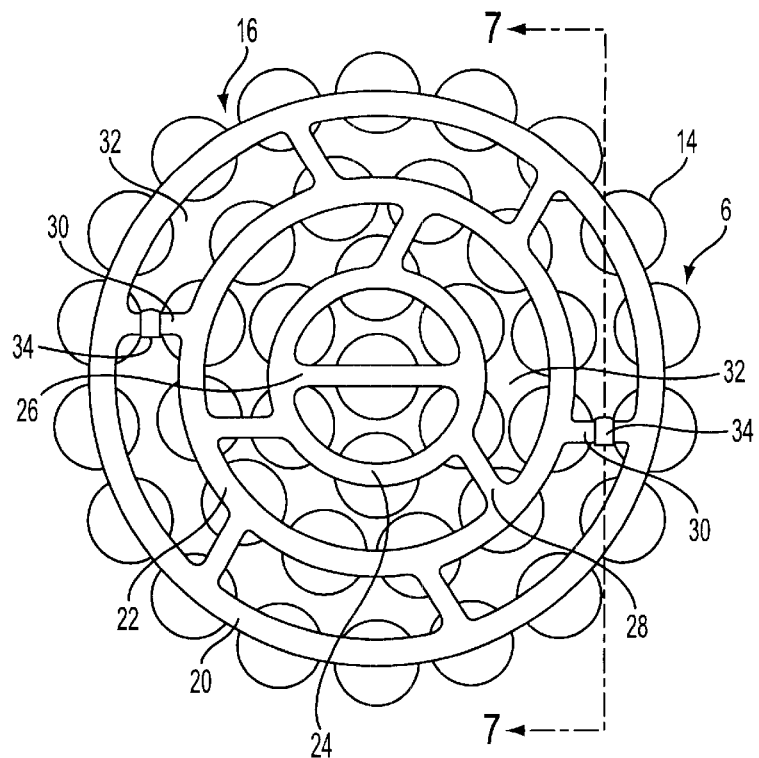
FIG. 6 is a front view of a CANDU®-6 fuel bundle end-plate for connecting to the end-plate of an adjacent bundle in accordance with the present invention.

Referring now to FIG. 6, fuel bundle 6 comprises a plurality of fuel elements 14 retained in parallel spaced relation at each end by end-plate 16. End-plate 16 comprises concentric circular inner, intermediate and outer webs 20, 22 and 24 interconnected by centre cross-web 26, intermediate cross-webs 28 and outer cross-webs 30. Fuel elements 14 are brazed or spot welded to circular webs 20, 22 and 24 and are maintained in parallel spaced relation uniformly about the central longitudinal axis of fuel bundle 6. Apertures 32 between the webs of end-plate 16 permit coolant flow through end-plate 16 and over fuel elements 14. Thus far described, end-plate 16 is of a conventional design as used in a CANDU®-6 fuel bundle.

Figure 7:
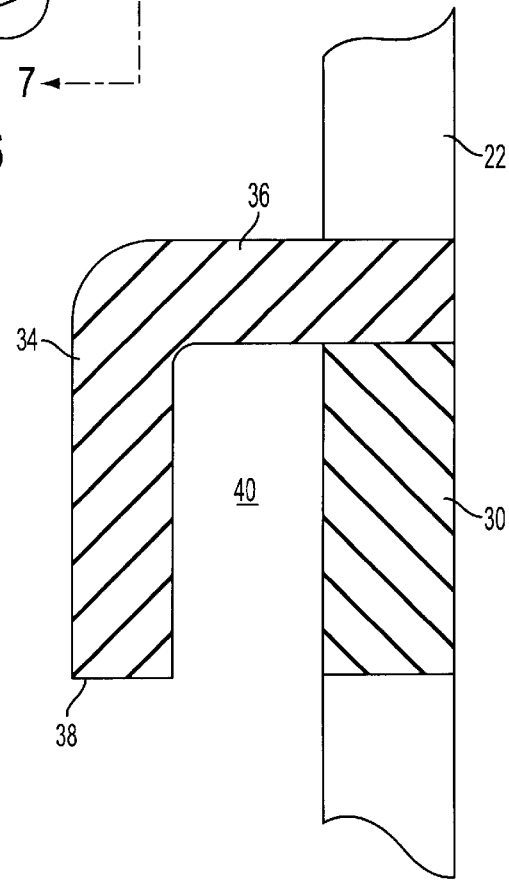
FIG. 7 is a part cross-sectional view of the end-plate interlocking member taken along line 7 in FIG. 6.

In order to permit adjacent fuel bundles to be interconnected in a predetermined position of radial alignment, end-plate 16 is fitted with two interconnecting hooks 34. Hooks 34 are carried on outer cross-webs 30 located on diametrically opposite sides of end-plate 16. Hooks can be separately formed and fastened to end-plate 16, for example by welding, or can be unitarily formed with end-plate 16. As more clearly shown in FIG. 7, hook 34 comprises an outward projecting leg 36 and a downward projecting leg 38 which together with outer cross-web 30 form a downwardly opening recess 40. Recess 40 is sized to receive and closely engage the corresponding outer cross-web of a facing end-plate of an adjacent bundle.

Figure 8:
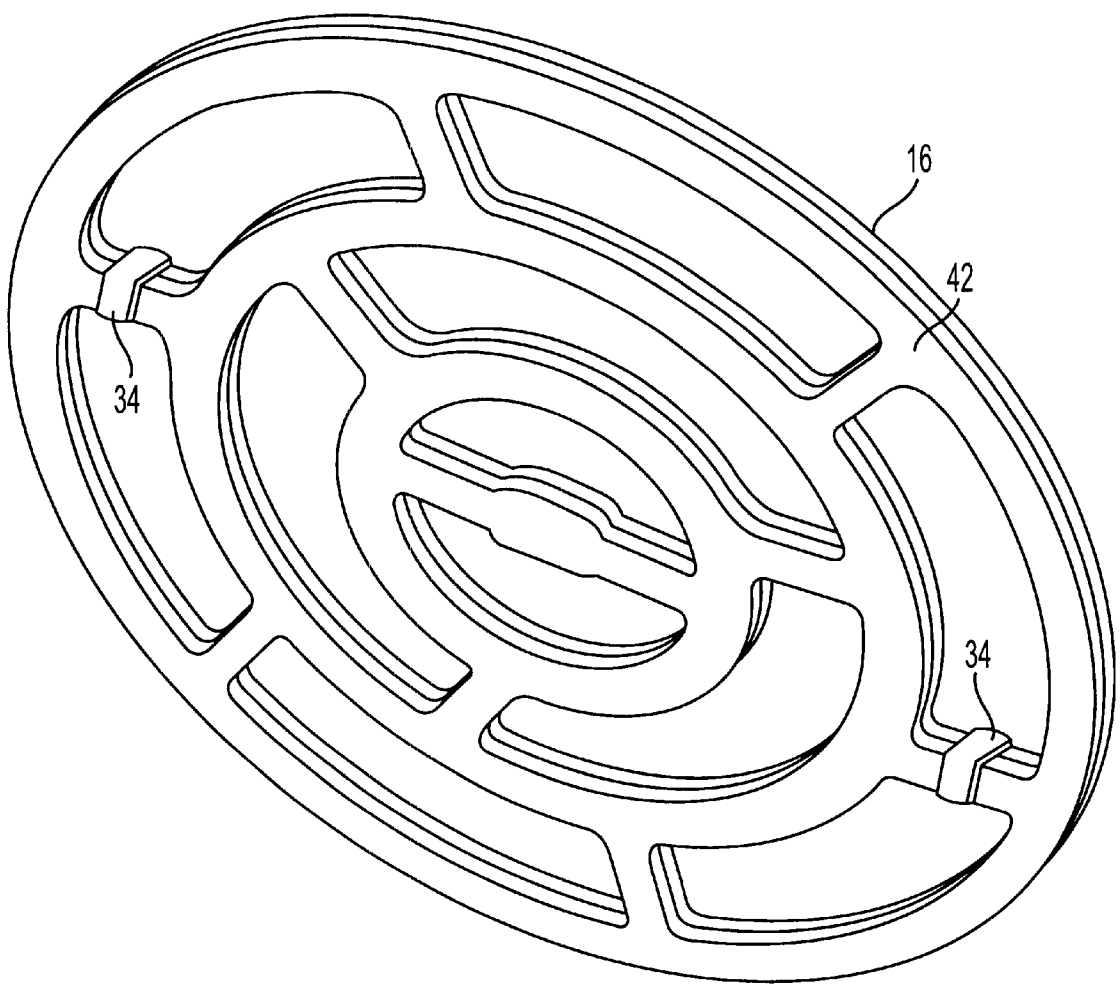
FIG. 8 is a perspective view of two end-plates interconnected in accordance with the present invention.

One fuel bundle in a given bundle pair carries at one end an end-plate -fitted with hooks 34 and at its other end a conventional-end plate without hooks 34. The other bundle in the bundle pair carries two conventional end-plates at its opposite ends. As shown in FIG. 8, adjacent bundles are interconnected by positioning them in end-to-end relation such that end-plate 16 fitted with hooks 34 on one bundle engages the conventional end-plate 42 on the adjacent bundle. Outer cross-web member 30 of conventional end-plate 42 is retained under hooks 34 of end-plate 16. Interconnection is achieved by raising the bundle end carrying end-plate 16 (typically by about 5 mm) such that hooks 34 just clear the corresponding outer cross-web 30 on the facing conventional end-plate 42 of the adjacent bundle, moving the bundles together such that their facing end-plates meet, and lowering bundle end such that hooks 34 engage the outer cross-web 30 on conventional end-plate 42. This operation can be conveniently carried out when the bundles are manually loaded into the fuel transfer mechanism at the beginning of the refuelling operation. At this station, the interconnection between the paired fuel bundles can be visually inspected.

In the case of a fuel channel for a CANDU®-6 type reactor which contains 12 fuel bundles, each of 6 interconnected pairs of fuel bundles exhibit alignment of the fuel elements. However, as junctions between the 6 bundle pairs remain unconnected, misalignment between the bundle pairs can occur. It has been discovered that even with misalignment at the 5 bundle junctions, the effect of interconnecting bundle pairs surprisingly provides significant enhancement of the CCP.

The gain in CCP by aligning fuel bundle pairs is not significantly affected by the type of bundle or the amount of diametrical creep of the pressure tube. Table 1 quantifies the change in junction K-factor $K_J$, total bundle K-factor $K_T$, and CCP for CANDU®-6 type reactors with 37 element fuel bundles aligned in accordance with the present invention in fuel channels having 0% and 3.1% diametrical creep.

TABLE 1

| | 0% Creep | 3.1% Creep |
|---|---|---|
| $K_J$ - aligned junction | 0.458 | 0.426 |
| $K_J$ - most probable | 0.715 | 0.650 |
| Avg change in bundle $K_J$ (aligned bundle pairs) | 18% | 17% |
| $K_T$ - aligned bundle junction (reference flow conditions) | 1.617 | 1.440 |
| $K_T$ - most probable bundle junction | 1.880 | 1.650 |
| Avg change in bundle $K_T$ (aligned bundles pairs) | -8% | -7% |
| CCP change (aligned bundle pairs in CCP limited channels) | | 1.5% |
| CCP change (aligned bundle pairs in all channels) | | 0.75% |

Table 2 quantifies the change injunction K-factor $K_J$, total bundle K-factor $K_T$, and CCP for CANDU® type reactors with the 43 element CANFLEX™ fuel bundles aligned in accordance with the present invention in fuel channels having 0 % and 3.1% diametrical creep.

TABLE 2

| | 0% Creep | 3.1% Creep |
|---|---|---|
| $K_J$ - aligned junction | 0.458 | 0.400 |
| $K_J$ - most probable | 0.754 | 0.629 |
| Avg change in bundle $K_J$ (aligned bundle pairs) | -20% | -18% |
| $K_T$ - aligned bundle junction (reference flow conditions) | 1.710 | 1.506 |
| $K_T$ - most probable bundle junction | 1.984 | 1.696 |
| Avg change in bundle $K_T$ (aligned bundles pairs) | -7% | -6% |
| CCP change (aligned bundle pairs in CCP limited channels) | | 1.5% |
| CCP change (aligned bundle pairs in all channels) | | 0.75% |

As is evident from Tables 1 and 2, the use of aligned bundle pairs using end-plate interlocks in accordance with the present invention reduces the pressure drop penalty of a bundle junction by about 35% (compare $K_J$ most probable and $K_J$ most probable and $K_J$ aligned) and increases CCP 0.75%.

The present invention has particular application to reactors having severely crept fuel channels. It has conventionally been considered that CHF will be higher for misaligned bundles due to better mixing of coolant and hence a smaller enthalpy imbalance among sub-channels. While this may be true for uncrept channels, it may not be true for severely crept channels in which flow-bypass becomes a concern. In such a case, misaligned bundles may actually increase the flow bypass effect, as misaligned bundles have effectively a higher resistance to bundle flow than aligned bundles. If the flow bypass effect becomes more important than the mixing effect, then bundle alignment in accordance with the present invention will both increase the CHF and lower the hydraulic resistance.

The increase in CCP attributable to bundle pair alignment depends on whether the interlocking bundles are located in all channels or only in those channels that are CCP limited. It has been determined that <10% of channels in operating CANDU type nuclear reactors have a critical power ratio (CPR) within 2% of the minimum value and are accordingly considered "margin limited". Although the critical channel location changes during the life of the reactor, the group of channels that is or will become margin limited during the fuel residence time in-reactor is predictable. If bundle pair interlocks in accordance with the present invention are limited to these ~10% of the potentially dryout-margin-limited channels, the header-to-header pressure drop will not be affected noticeably, and the gain in CCP will be 1.5%, significantly higher than the case where all fuel channels contain aligned bundle pairs because the flow is effectively redistributed through the CCP-limited channels.

The gain in CCP that can be achieved by the present invention may well be greater than that indicated in Tables 1 and 2. The calculations underlying the results in Tables 1 and 2 assume a random misalignment of the 5 unconnected end-plate junctions between the six bundle pairs.

However, the degree of rotation of a bundle pair during its residence time in a reactor may be more limited than the degree of rotation of individual bundles due to the doubling of the mass to be rotated. Thus, a bundle pair that is aligned upon insertion into the fuel channel may exhibit a greater degree of alignment and reduced hydraulic resistance throughout its residence time.

While the present invention has been described with reference to the particular hook type interlocking means 34 shown in FIG. 8, it will be appreciated that other shapes and placements of interlocking means are possible and within the scope of the invention. For example, a hook type interlocking member can be located on other web members of the end-plate such as centre cross web 26 shown in FIG. 6. However, alternate interlocking members should provide similar functionality to that shown in FIG. 8 including:

Ease of assembly: interlocks should be easy to engage and disengage.

Flexibility: interlocks should permit minimal bundle movement through pressure tubes that have sagged over their operational lifetime, and permit sufficient lateral movement as required during fuelling and discharge.

Positive interlock: bundle pairs must remained aligned during transit in-the reactor fuel channels. This requirement dictates that the interlocks remain attached during the fuelling operation and cannot separate axially beyond that required to permit minimal bundle movement as discussed above.

Simplicity: interlocks are preferably a simple design modification to existing fuel bundle end-plate designs and should be easy to manufacture or retrofit.

Low mass: interlocks should not significantly increase the Zr mass of the fuel bundle.

Compatibility: interlocks should not interfere with fuel bundle handling and refuelling tools, fuel bundle separators or shield plugs.

No penalty: interlocks should not affect the fretting, pressure drop and CHF such that additional licensing approval must be sought, apart from re-analysis of the CCP to account for the increase channel flow.

Applicability: interlocks should be applicable to a variety of fuel bundle and end-plate designs.

In accordance with the present invention, every second bundle in a fuel channel will have one end-plate fitted with interconnecting hooks. To reduce the possibility of bundle mix-up, the end-plate fitted with interconnecting hooks can be colour or bar coded and an optical reader can be used to ensure proper alignment. Other suitable fool-proof methods can be used.

Some fuel bundles end-plates may become slightly dished because of permanent elongation of the higher-powered fuel elements. The placement of the bundle interconnecting hooks on the outer-ring cross-webs as shown on FIG. 8 is preferred because the dishing effect, near the periphery of the end-plate is minimal. In addition, the provision of tolerance between the interconnecting hooks and the corresponding cross-web of the adjacent paired bundle permits some end plate deformation without causing failure of the hooks.

It will be understood that various modifications may be made to the invention without departing from the scope of the invention described and claimed herein.

The embodiments of the invention in which an exclusive property or privilege is claimed are defined as follows:

1. A fuel channel assembly for use in a pressurized fuel-channel-type nuclear reactor of the type adapted to be refueled on-line by the insertion and removal of fuel bundles into and from a plurality of fuel channel assemblies, each of said fuel channel assemblies comprising an elongated pressure tube and a plurality of fuel bundles longitudinally disposed in said pressure tube in end-to-end relation, each of said fuel bundles comprising a plurality of elongated fuel elements retained in parallel spaced relation uniformly about a longitudinal axis between transversely disposed end-plates, said end plates having apertures there through to permit coolant flow through said fuel channels in contact with said fuel elements, the fuel channel assembly further comprising at least one fuel bundle pair assembly, said fuel bundle pair assembly comprising a pair of fuel bundles in end-to-end relation and interconnecting means for interconnecting the adjacent facing end-plates of said pair of fuel bundles, said adjacent facing end-plates of said pair of fuel bundles being interconnected by said interconnecting means for maintaining said fuel elements in a predetermined position of relative rotational alignment about said longitudinal axis and preventing axial separation of said pair of fuel bundles in the pressure tube, the non-facing end-plates at opposite ends of said fuel bundle pair assembly permitting said fuel bundle pair assembly to be axially separable from adjacent bundles in the pressure tube to permit independent loading or unloading of said fuel bundle pair assembly.

2. The fuel channel assembly of claim 1 wherein the means for interconnecting comprises at least one retaining member fixed to one of said facing end-plates and closely engaging the other of said end-plates.

3. The fuel channel assembly of claim 2 wherein each end-plate comprises inner, intermediate and outer concentric ring web members, said inner and intermediate ring web members being interconnected by inner cross-webs and said intermediate and outer ring web members being interconnected by outer cross-webs, and comprising two hook members each connected to an outer cross-web of said one of said facing end-plates and extending longitudinally through an aperture and transversely behind the corresponding outer cross-web of the other of said facing end-plates.

4. The fuel channel assembly of claim 2 wherein each end-plate comprises inner, intermediate and outer concentric ring web members, said inner and intermediate ring web members being interconnected by inner cross-webs and said intermediate and outer ring web members being interconnected by outer cross-webs, and comprising two hook members each connected to an inner cross-web of said one of said facing end-plates and extending longitudinally through an aperture and transversely behind the corresponding inner cross-web of the other of said facing end-plates.

5. The fuel channel assembly of claim 1 wherein the predetermined position of relative rotational alignment is selected to produce minimum hydraulic resistance to coolant flow through said fuel bundle pair assembly.

6. The fuel channel assembly of claim 1 wherein the predetermined position of relative rotational alignment is selected to longitudinally align the fuel elements of said pair of fuel bundles.

\* \* \* \* \*